J. SANGSTER.
MACHINE FOR CUTTING FIBROUS MATERIAL.
No. 184,912. Patented Nov. 28, 1876.
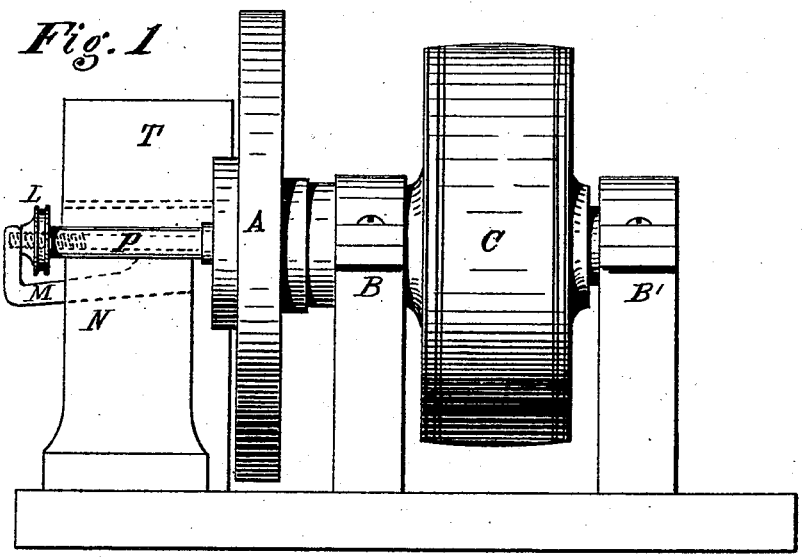
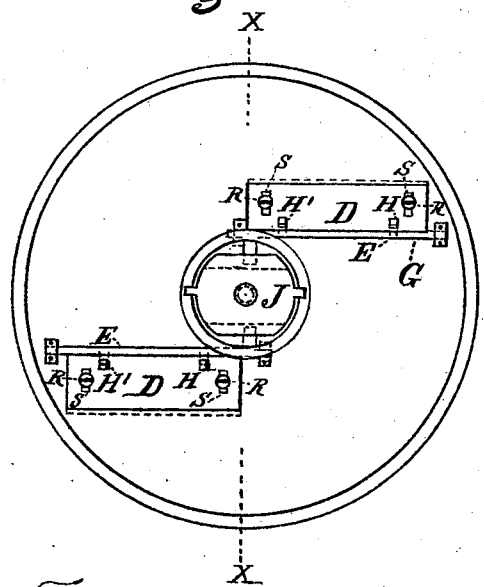
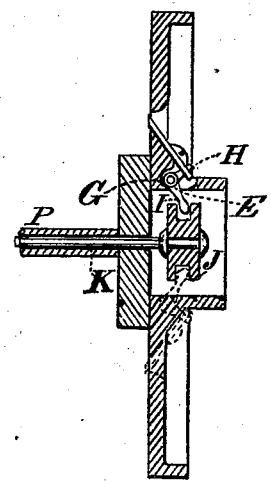
Witnesses,
F. P. Stiker
Hugh Sangster
Inventor,
James Sangster

UNITED STATES PATENT OFFICE.

JAMES SANGSTER, OF BUFFALO, NEW YORK, ASSIGNOR TO EDWARD M. JEWETT, OF SAME PLACE.

IMPROVEMENT IN MACHINES FOR CUTTING FIBROUS MATERIALS.

Specification forming part of Letters Patent No. 184,912, dated November 28, 1876; application filed August 24, 1876.

*To all whom it may concern:*

Be it known that I, JAMES SANGSTER, of the city of Buffalo, in the county of Erie and State of New York, have invented certain new and useful Improvements in Machines for Cutting Fibrous and other Material, which improvements are fully set forth in the following specification, reference being had to the accompanying drawings.

The object of this invention is to afford the means for cutting thin shavings of wood for stuffing mattresses, for dyeing, or for cutting hard dried beef, or other equivalent material, into thin sheets or chips; and it consists in the combination of a revolving disk, two or more cutters made adjustable in the direction of the cutting-edge, and their adjusting devices, consisting of levers arranged below them, so as not to obstruct the passage of the cuttings, a rod having a slotted or grooved piece attached to the end, arranged within the disk, so as to turn easily thereon, and a thumb-screw at the opposite end outside of the disk, so that they may be made to move in the direction of the cutting-edge, or adjusted thereby, while the machine is in motion, as will be more clearly hereinafter described.

In said drawings, Figure 1 represents a side elevation of the machine complete; Fig. 2, a back view of the disk and cutters; and Fig. 3 is a section through line X X, Fig. 2.

A represents the disk. It is fastened to a spindle in suitable bearings, B B'. C is a pulley for driving it. D D are the cutters, which are fastened to the back of the disk, so that their cutting-edges may project through the face of the same, as shown in Figs. 2 and 3. They are closely fitted to the disk, so as to be held firmly in place, and at the same time be adjustable. E E represent rods arranged to move in suitable bearings F on the disk. A depression is made in the disk at G G, to receive the rods E just below the knives. Upon said rods are attached arms H H', which project through holes in the cutters, as shown. At one end of said rods is connected an arm, I, arranged at right angles, or nearly so, to the arms H H'. J represents a slotted piece, having the arms I fitted therein, as shown in Fig. 3. K is a rod made to turn easily in the piece J.

In Fig. 1, L represents a thumb-screw, connected at the opposite end of K. This thumb-screw turns easily on said rod, but is held by the pieces M N and tube or sleeve P from moving in the direction of K, so that by turning it, K is made to move longitudinally, so as to adjust the cutters in or out, as will be readily understood.

The cutters are held in place by the set-screws R passing through the holes S in the knives. T represents a gage board or table, upon which the material to be cut is held.

I claim as my invention—

1. The combination of the revolving disk A, cutters D, rods E, provided with arms H, H', and I, with the slotted piece J, rod K, and thumb-screw L, substantially as and for the purposes described.

2. The combination of the disk A, cutters D, rods E, provided with arms H, H', and I, with the slotted piece J, rod K, thumb-screw L, and parts M N P, substantially as and for the purposes specified.

JAMES SANGSTER.

Witnesses:
 H. SANGSTER,
 T. P. STIKER.